(12) United States Patent
Soh (10) Patent No.: US 11,987,435 B2
(45) Date of Patent: May 21, 2024

(54) GAS DISCHARGE VALVE FOR PACKAGING MATERIAL

(71) Applicant: Yoon Sub Soh, Yongin-si (KR)

(72) Inventor: Yoon Sub Soh, Yongin-si (KR)

( * ) Notice: Subject to any disclaimer, the term of this patent is extended or adjusted under 35 U.S.C. 154(b) by 216 days.

(21) Appl. No.: 17/605,112

(22) PCT Filed: Apr. 17, 2020

(86) PCT No.: PCT/KR2020/005190
§ 371 (c)(1),
(2) Date: Oct. 20, 2021

(87) PCT Pub. No.: WO2020/246704
PCT Pub. Date: Dec. 10, 2020

(65) Prior Publication Data
US 2022/0204238 A1    Jun. 30, 2022

(30) Foreign Application Priority Data

Jun. 3, 2019    (KR) .................. 10-2019-0065640

(51) Int. Cl.
*B65D 77/22*    (2006.01)
*B32B 7/12*    (2006.01)
*B32B 37/12*    (2006.01)

(52) U.S. Cl.
CPC .............. *B65D 77/225* (2013.01); *B32B 7/12* (2013.01); *B32B 37/12* (2013.01); *B32B 2439/70* (2013.01)

(58) Field of Classification Search
CPC ... B65D 77/225; F16K 15/144; F16K 15/147; B32B 7/12; B32B 37/12; B32B 2439/70
See application file for complete search history.

(56) References Cited

U.S. PATENT DOCUMENTS 7,685,793 B2 *   3/2010   Newrones ............. F16K 15/144
                                                    383/44
8,746,281 B2 *   6/2014   Morin .................. B65D 77/225
                                                    220/203.11
(Continued)

FOREIGN PATENT DOCUMENTS

EP          0023703 A1 *  2/1981
JP          H05-112375 A   5/1993
(Continued)

OTHER PUBLICATIONS

International Search Report dated Jul. 27, 2020 in corresponding International application No. PCT/KR2020/005190; 4 pages.
(Continued)

*Primary Examiner* — Hailey K. Do
(74) *Attorney, Agent, or Firm* — NKL Law; Byungwoong Park (57) ABSTRACT

Proposed is a gas discharge valve for a packaging material, the gas discharge valve being attached on an upper surface of a packing material in a manner that covers a through-hole formed in one side of the packing material and being configured to discharge to the outside thereof only gas within the packing material, the gas discharge valve including: a high-adhesiveness layer attached to an external surface of the packing material and adhered to a portion of the external surface in the vicinity of the through-hole; and a low-adhesiveness layer formed inside the high-adhesiveness layer and adhered to cover a top opening of the through-hole, where, when gas occurs within the packing material, the low-adhesiveness layer is inflated by pressure, a portion thereof is raised, and the gas is discharged, and when the pressure is released, the low-adhesiveness layer seals the through-hole, thereby blocking introduction of outside air.

8 Claims, 10 Drawing Sheets

(56) References Cited

U.S. PATENT DOCUMENTS

| | | | | |
|---|---|---|---|---|
| 9,187,229 B2 * | 11/2015 | Hoffman | ............ | B65D 77/225 |
| 9,810,335 B2 * | 11/2017 | Gardner | ................ | B65D 25/00 |
| 10,138,024 B2 * | 11/2018 | Pettis | ........................ | B32B 7/00 |
| 10,358,275 B1 * | 7/2019 | Cramer | ............... | F16K 17/0453 |
| 2001/0012530 A1 * | 8/2001 | Hiyoshi | ............... | B65D 77/225 |
| | | | | 220/203.11 |

FOREIGN PATENT DOCUMENTS

| | | | | |
|---|---|---|---|---|
| JP | H06-057861 U | 8/1994 | | |
| JP | 2003300564 A | 10/2003 | | |
| KR | 20-0440557 Y1 | 6/2008 | | |
| KR | 10-1044250 B1 | 6/2011 | | |
| KR | 10-1395609 B1 | 6/2014 | | |
| KR | 10-1655281 B1 | 9/2016 | | |
| KR | 2020170002742 U | 8/2017 | | |
| KR | 10-20400443 B1 | 11/2019 | | |
| WO | 2004106190 A1 | 12/2004 | | |
| WO | WO-2004108557 A2 * | 12/2004 | ............ | B31B 19/84 |
| WO | WO-2005026020 A1 * | 3/2005 | ........... | A23L 3/3418 |
| WO | WO-2005059869 A1 * | 6/2005 | ........... | B65D 77/225 |
| WO | WO-2006075758 A1 * | 7/2006 | ........... | B65D 77/225 |
| WO | 2006107974 A1 | 10/2006 | | |
| WO | 2006107975 A2 | 10/2006 | | |

OTHER PUBLICATIONS

EESR, European Patent Office, Application No. 201819255.9 (Mar. 24, 2022).
Office Action, European Patent Office, Application No. 20819255.9 (Apr. 7, 2023).

* cited by examiner

GAS DISCHARGE VALVE FOR PACKAGING MATERIAL

The present disclosure relates to a check valve for discharging gas within a sealed container and, particularly, to a gas discharge valve for a packaging material. The gas discharge valve for a packaging material is a valve for a packaging material, the valve serving to discharge in a single direction gas occurring within a sealed container and to prevent introduction of outside gas. The gas discharge valve includes: a high-adhesiveness layer attached to an external surface of the packing material and adhered in a lengthwise direction to a portion of the external surface of the packing material in the vicinity of a through-hole; and a low-adhesiveness layer formed inside the high-adhesiveness layer and adhered in such a manner to cover a top opening of the through-hole. A width of each of the high-adhesiveness layer and the low-adhesiveness layer or an adhesive strength of the low-adhesiveness layer is adjusted, and thus the degree of opening of the valve is adjusted suitably for contents accommodated within the packing material.

BACKGROUND

Generally, manufactured foods go through various distribution channels and then are delivered for use to final consumers.

While distributed and stored, the manufactured foods are subject to various outside influences such as temperature, humidity, heat, and light, and to various inside influences such as a chemical change in the food itself and a microbial activity. In some cases, food nutrition and a value as a commodity may be lost while the food is distributed and stored.

When predetermined foods are distributed and stored, packing materials having various shapes and properties are used according to types, shapes, and properties of the foods. For example, the packing materials may employ two types of structures: a sealed structure and a communicating structure. In the sealed structure, air within the packing material is completely blocked from being brought into contact with outside air. In the communicating structure, the air within the packing material is dischargeable to the outside.

Particularly, in a case where ground coffee, a predetermined fermented food, or the like is accommodated within a food packing material, a chemical change, such as maturation or fermentation, in a food itself, occurs due to a change in an external environment or the passage of time. At this point, pressure within the food packing material increases due to occurrence of gas, and thus the food packing material may be arbitrarily damaged, and the accommodated food may degenerate.

In the related art, in order to solve these problems, a technology is disclosed in Korean Patent No. 10-1395609 titled DEGASSING VALVE FOR IN CONTAINER (registered on May 9, 2014).

The degassing valve includes a valve housing, an elastic disk, and a valve cover. The valve housing accommodates a disk and a valve cover. The elastic disk is inserted into the valve house for installing. The valve cover is inserted into the valve housing for installing and is pressed against the disk for supporting.

The valve housing includes a disk nesting potion, a disk accommodation concave groove, a plurality of discharge holes, a circumferential groove, and a valve-cover deviation prevention protrusion. The disk nesting portion is provided within the valve housing. The disk accommodation concave groove is provided an upper surface of the disk nesting portion and accommodates an external surface of the disk. The plurality of discharge holes are formed radially between a center portion of the disk nesting portion and a radius along which the disk is compressed by a pressing portion of the valve cover. The circumferential groove is formed to be connected seamlessly to the disk accommodation concave groove and accommodates a protrusion portion of the valve cover. The valve-cover deviation prevention protrusion supports the protrusion portion of the valve cover.

The disk includes a disk hole formed in a center portion thereof. Gas is discharged through the disk hole.

The valve cover is configured to include a pressing portion, a frame, a gas discharge outlet, and the protrusion portion. The pressing portion has a flat surface over a distance from the protrusion portion thereof to the center thereof. The flat surface serves to press a flat surface of the disk. The frame having a thickness smaller than a cross-section thickness of the flat surface is provided over a distance from an end of the flat surface to the center thereof. The gas discharge outlet is formed in a center portion thereof. Gas is discharged through the gas discharge outlet. The protrusion portion is provided toward the outside and has a semi-circular shape.

In the related art, another technology is disclosed in Korean Patent No. 10-1655281 titled GAS DISCHARGE CAP FOR PACKAGE) (registered on Sep. 1, 2016).

The gas discharge cap includes a main body, a film member, and a cover member. The main body is combined in an airtight manner with one side of a package for wrapping. A concave bottom surface is formed on a center portion thereof. A first discharge hole through which gas is discharged is formed in a center portion of the concave bottom surface. The film member arrives stably on the concave bottom surface. A slit is formed in a center portion thereof. The slit is opened and closed by gas discharged through the first discharge hole. The cover member is positioned on an upper portion of the film member. The cover member is combined with an edge of the bottom member in such a manner that an edge of the film member is gripped to prevent the film member from deviating from the main body side. The first discharge hole and a second discharge hole through which the gas discharged through the slit is finally discharged are formed in the cover member.

The film member is formed of an elastic material. Thus, after the slit is opened upward by pressure of the gas, the film member returns to an original state thereof by an elastic force thereof.

A tape is bonded to an upper portion of the slit in such a manner that the slit is covered for airtightness, but bonded only in one direction with respect to the slit. A filter member is provided on a bottom surface of the first discharge hole. The filter member prevents contents from being discharged, except for the gas. A layer of viscid liquid is formed on the bottom surface of the first discharge hole in such a manner that the film member stably arrives on the bottom surface in an airtight manner and that a very small amount of flowing air is thus prevented.

However, in the related art, packing materials, as described above, have an air discharge structure in which the gas occurring within the packing material is discharged to the outside through a minute hole. Accordingly, the minute hole is easily blocked due to a property of a food, and thus the packing material frequently does not perform an intended function thereof. Particularly, the gas discharge cap having the complex structure described above is required to be attached to the packing material. Thus, the manufacturing of this separate component increases an overall cost of the packing material. Thus, the cost competitiveness of the packing material is difficult to achieve.

In addition, the configuration where the layer of viscid liquid, such as oil, is formed to block the minute hole and to open and close the valve is employed. However, pressure for opening the valve and pressure for closing the valve vary according to a property of a food accommodated within a packing material. For this reason, the opening and closing of the valve through the use of the oil (through a layer of oil) occur irregularly. Thus, the food packing material may be arbitrarily damaged or the oil may spread or be contaminated in a high-temperature or high-pressure environment. As a result, outside oxygen is introduced into the packing material, and thus the stored food degenerates.

SUMMARY

An objective of the present disclosure, which is made to solve the above-described problems, is to provide a new-type gas discharge valve for a packaging material, the new-type gas discharge valve being capable of being attached to a packing material into which ground coffee, a predetermined fermented food, or the like is packaged. In the new-type gas discharge valve, gas occurring from the food during transportation is smoothly discharged, and outside air is blocked from being introduced into the packing material, thereby preventing a decrease in a commercial value of a commodity within the packing material.

Particularly, another objective of the present disclosure is to provide a new-type gas discharge valve for a packaging material, the new-type gas discharge valve including a high-adhesiveness layer configured in the form of a film and a low-adhesiveness layer formed underneath a portion of the high-adhesiveness layer. With this structure, in a case where the packing material expands due to gas occurring therewithin, the low-adhesiveness layer is moved a distance from the packing material, and thus a discharge hole is opened to discharge the gas. Furthermore, after the gas is discharged, the low-adhesiveness layer closes the discharge hole. This processing of naturally opening and closing the discharge hole removes an internal pressure of the packing material that occurs due to the gas and prevents introduction of outside oxygen into the packing material. Thus, an accommodated food can be prevented from degenerating.

Moreover, still another objective of the present disclosure is to provide a new-type gas discharge valve for a packaging material, the new-type gas discharge valve being capable of easily adjusting respective sizes, widths, thicknesses, and the like of a high-adhesiveness layer and a low-adhesiveness layer and thus of dealing with different amounts of discharged gas and discharge speed for a food, such as ground coffee, that is accommodated within the packing material. Thus, the packaging quality of ground coffee or a predetermined fermented food can be implemented.

In addition, still another objective of the present disclosure is to provide a new-type gas discharge valve for a packaging material, the new-type gas discharge valve being capable of ensuring that gas occurring due to a chemical change, such as maturation or fermentation, of a food itself that is accommodated within the packing material is smoothly discharged and that oxygen is blocked from being introduced into the packing material. Accordingly, a packaged state of ground coffee, a predetermined fermented food, or the like that is accommodated within the packing material can be stably maintained.

In order to achieve the above-described objectives, according to an aspect of the present disclosure, there is provided a gas discharge valve for a packaging material, the gas discharge valve A being attached to an upper surface of a packing material 1 in a manner that covers a through-hole 1a formed in one side of the packing material 1 and being configured to discharge to the outside thereof only gas within the packing material 1 within which contents are accommodated, the gas discharge valve A including: a high-adhesiveness layer 10 attached to an external surface of the packing material 1 and adhered in a lengthwise direction to a portion of the external surface of the packing material 1 in the vicinity of the through-hole 1a; and a low-adhesiveness layer 20 formed inside the high-adhesiveness layer 10 and adhered in such a manner to cover a top opening of the through-hole 1a, wherein, when gas occurs within the packing material 1, in a state where the high-adhesiveness layer 10 is adhered to the packing material 1, the low-adhesiveness layer 20 is inflated by pressure, a portion thereof is raised, and the gas is discharged, and when the pressure is released, the low-adhesiveness layer 20 returns to an original state thereof, the through-hole 1a is sealed, and outside air is blocked from being introduced.

In the gas discharge valve A, the high-adhesiveness layer 10 and the low-adhesiveness layer 20 may be adhered in the form of a film to a portion of the packing material 1 in the vicinity of the through-hole 1a.

The gas discharge valve A may further include an auxiliary high-adhesiveness layer 30 formed between the low-adhesiveness layer 20 and the packing material 1, with a hole 31 concentric with, and communicating with, the through-hole 1a being formed in the auxiliary high-adhesiveness layer 30, wherein even in a case where the packing material 1 is made of roughened paper or where the packing material 1 is folded and thus a surface thereof is difficult to keep flat, a state where the low-adhesiveness layer 20 is adhered to the packing material 1 may be maintained and the low-adhesiveness layer 20 may be smoothly raised and leveled.

In the gas discharge valve A, the high-adhesiveness layer 10 and the low-adhesiveness layer 20 may be configured in such a manner that a ratio of a width of the low-adhesiveness layer 20 to a width of an edge portion, formed on one of both sides of the low-adhesiveness layer 20, of the high-adhesiveness layer 10 is 10:5.

In the gas discharge valve A, the low-adhesiveness layer 20 may be formed of silicone adhesive.

In the gas discharge valve A, the low-adhesiveness layer 20 may be formed of resin with self-adhesiveness that is selected from among low-density PE (polyethylene), metallocene, EVA (ethylene vinyl acetate), PB (polybutylene), EMA (ethylene methyl acrylate), EAA (ethylene acrylic acid), EMAA (ethylene methacrylic acid), and EMMA (ethylene methyl methacrylate).

In the gas discharge valve A, the low-adhesiveness layer 20 may be configured by mixing olepin resin, such as PE or PP, with a plasticizer and an anti-fog agent.

In the gas discharge valve A, the high-adhesiveness layer 10 may be formed of resin with adhesiveness that is selected from among acrylic resin, rubber resin, silicone resin, and butyl resin.

In the gas discharge valve A, small-molecule polyisobutylene (PIB) may be added into the low-adhesiveness layer 20, and thus the low-adhesiveness layer 20 may maintain not only a sticky state, but also the form of a sticky gel due to KB that migrates to the outside with the passage of time.

In the gas discharge valve A, the low-adhesiveness layer 20 formed of the resin with self-adhesiveness that is selected from among low-density PE, metallocene, EVA, PB, EMA, EAA, EMAA, and EMMA may further include a silicone thin film on a surface thereof.

Advantageous Effects

As described above, the gas discharge valve for a packaging material according to the preferred embodiments of the present disclosure is installed on a packing material for a commodity transported in a packaged state, such as ground coffee or a predetermined fermented food. The gas discharge valve can provide an advantageous effect of smoothly discharging gas occurring from the commodity during transportation, blocking introduction of outside air into the packing material, and thus preventing a decrease in a commercial value of the commodity.

In addition, the gas discharge valve for a packaging material according to the present disclosure is configured to include a high-adhesiveness layer configured in the form of a film and a low-adhesiveness layer formed underneath a portion of the high-adhesiveness layer. In a case where the low-adhesiveness layer is adhered to an upper surface of a packing material in such a manner to cover a gas discharge through-hole formed in the packing material and to seal the packing material and where gas occurs within the sealed packing material and thus the sealed packing material expands, the low-adhesiveness layer is moved a distance from the packing material by pressure and thus the through-hole is opened to discharge the gas. After the gas is discharged, the low-adhesiveness layer closes the through-hole. This process of opening and closing the through-hole is naturally performed. Thus, it can be ensured that the gas occurring due to a chemical change, such as maturation or fermentation, of a food itself that is accommodated within the packing material is smoothly discharged and that oxygen is blocked from being introduced into the packing material. Accordingly, the gas discharge valve provides an advantageous effect of stably maintaining a packaged state of ground coffee, a predetermined fermented food, or the like that is accommodated within the packing material.

Furthermore, the gas discharge valve for a packaging material is capable of easily adjusting respective sizes, widths, thicknesses, and the like of the high-adhesiveness layer and the low-adhesiveness layer and thus of dealing with different amounts of discharged gas and discharge speeds for a food, such as ground coffee, that is accommodated within the packing material. Thus, the gas discharge valve provides an advantageous effect of improving the packaging quality of ground coffee or a predetermined fermented food.

Particularly, the gas discharge valve for a packaging material according to the present disclosure provides an advantageous effect of discharging not only gas occurring due to a chemical change in a food itself, such as ground coffee or a fermented food, within the packing material, but also finding easy application in discharging steam occurring when cooking an instant food.

DETAILED DESCRIPTION OF THE EMBODIMENTS

Embodiments of the present disclosure will be described in detail below with reference to the accompanying drawings in such a manner that a person of ordinary skill in the art to which the present invention pertains is enabled to practice the present disclosure without undue experimentation. However, the embodiments of the present disclosure are described only in an exemplary manner in terms of structures and functions, and therefore should not be construed to impose any limitation on the claimed scope of the present disclosure. That is, various modifications to the embodiments would be made in various forms, and therefore equivalents that can realize the technical idea of the present disclosure should be understood as included within the claimed scope of the present disclosure. In addition, specific embodiments are not meant to be required to achieve all the objectives of the present disclosure or all the advantageous effects thereof or to achieve only the advantageous effects, and therefore should not be understood as imposing any limitation on the claimed scope of the present disclosure.

The means of the terms used throughout the present specification should be understood as follows.

The terms "first", "second", and so forth are used to differentiate one constituent element from another and should not impose any limitation on the claimed scope of the present disclosure. For example, a first constituent element may be named a second constituent element. In the same manner, the second constituent element may also be named the first constituent element.

It should be understood that a constituent element, when referred to as being "connected to" a different constituent element, may be directly connected to the different constituent element or may be connected to the different constituent element with an intervening constituent element in between. In contrast, it should be understood that a constituent element, when referred to as being "directly connected to" a different constituent element, is connected to the different constituent element with no intervening constituent element in between. Expressions such as "between" and "directly between" and expressions such as "adjacent to" and "directly adjacent to" that are used to describe a relationship between constituent elements should also be construed in the same manner.

It should be understood that, throughout the present specification, the indefinite article "a/an" is used to mean "one or more", not only one, except as distinctively stated in context and that the terms "include", "have", and the like are used to indicate that a feature, a number, a step, an operation, a constituent element, a component, or any combination thereof is present without precluding the presence or addition of one or more other features, numbers, steps, operations, constituent elements, or any combination thereof.

Unless otherwise defined, all terms including technical or scientific terms, which are used throughout the present specification, have the same meanings as are normally understood by a person of ordinary skill in the art to which the present disclosure pertains. The term as defined in commonly used dictionaries should be construed as having the same contextual meaning as that in the related art and, unless otherwise explicitly defined in the present disclosure, should not be construed as having an excessively implied meaning or a purely literal meaning.

A gas discharge valve for a packaging material according to embodiments of the present disclosure will be described in detail below with reference to the accompanying drawings.

Figure 1:
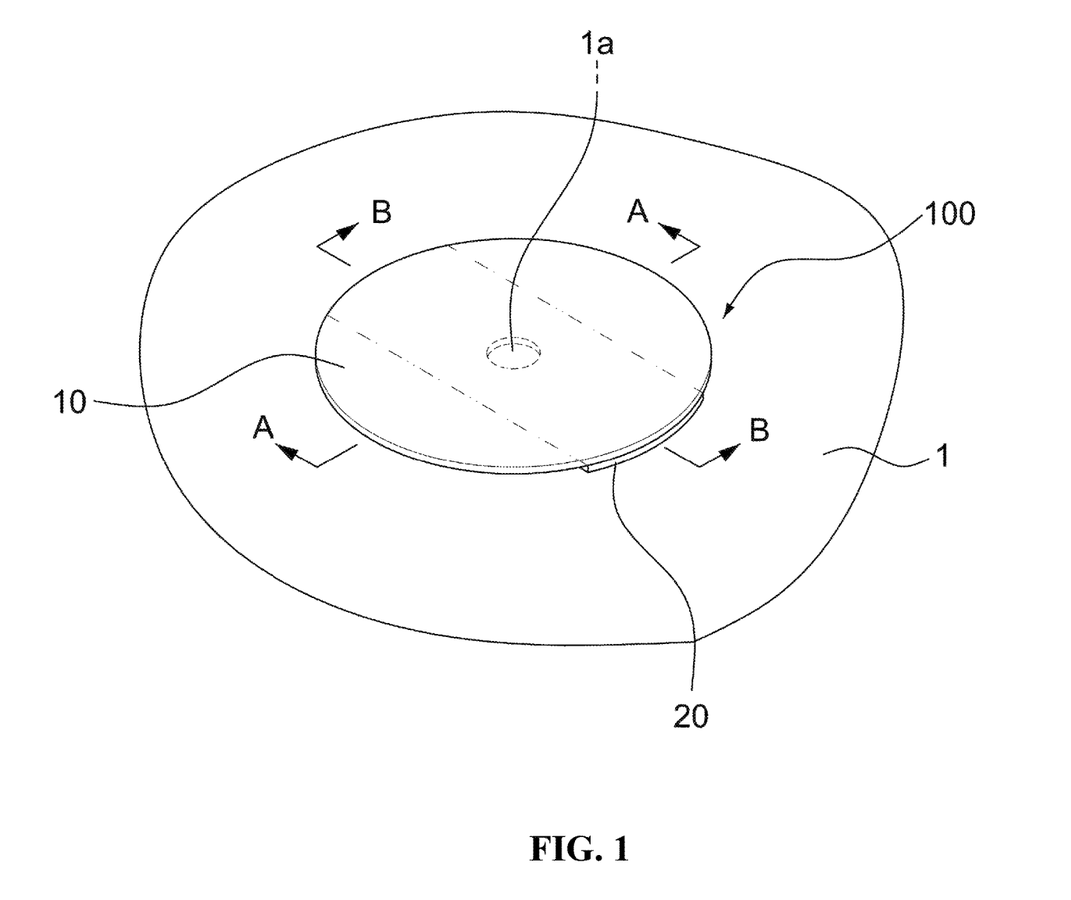
FIG. 1 is a perspective view illustrating a state where a gas discharge valve for a packaging material according to a first embodiment of the present disclosure is attached to a packing material.
Figure 2A:
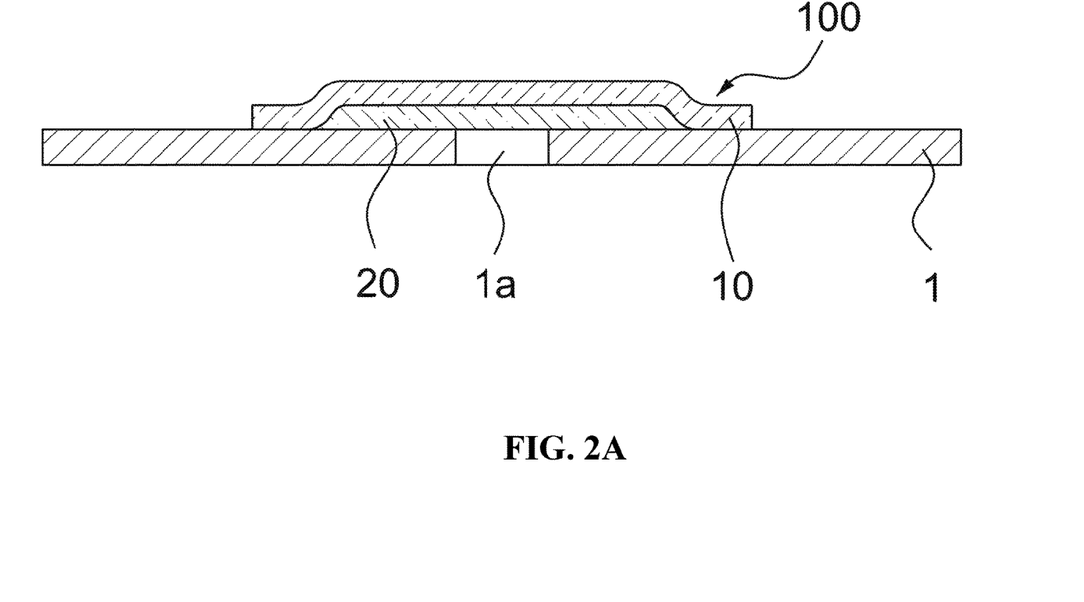
FIG. 2A is a cross-sectional view taken along line A-A on FIG. 1 illustrating the state where the gas discharge valve for a packaging material according to the first embodiment of the present disclosure is attached to the packing material.
Figure 2B:
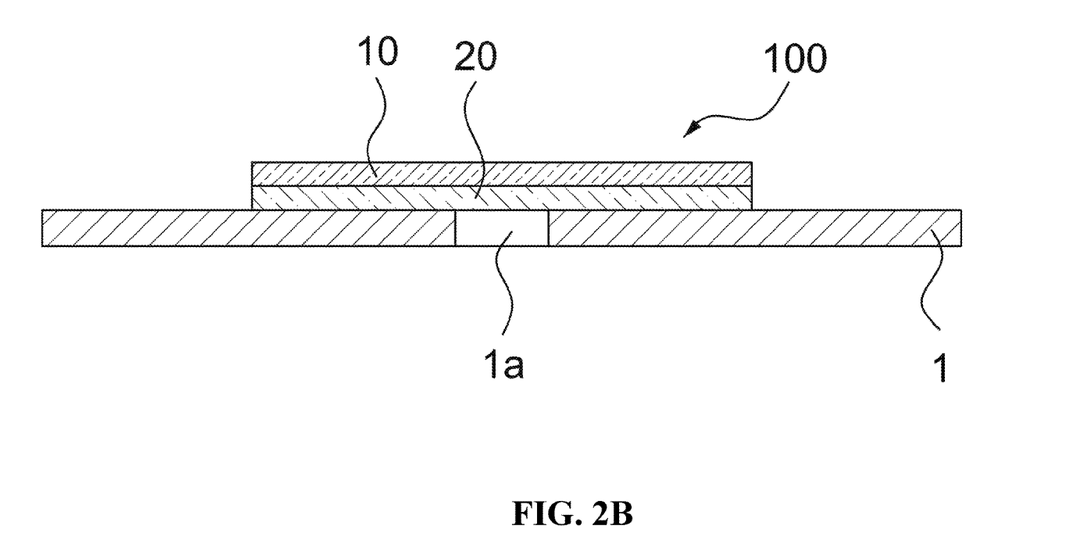
FIG. 2B is a cross-sectional view taken along line B-B on FIG. 1 illustrating the state where the gas discharge valve for a packaging material according to the first embodiment of the present disclosure is attached to the packing material.
Figure 2C:
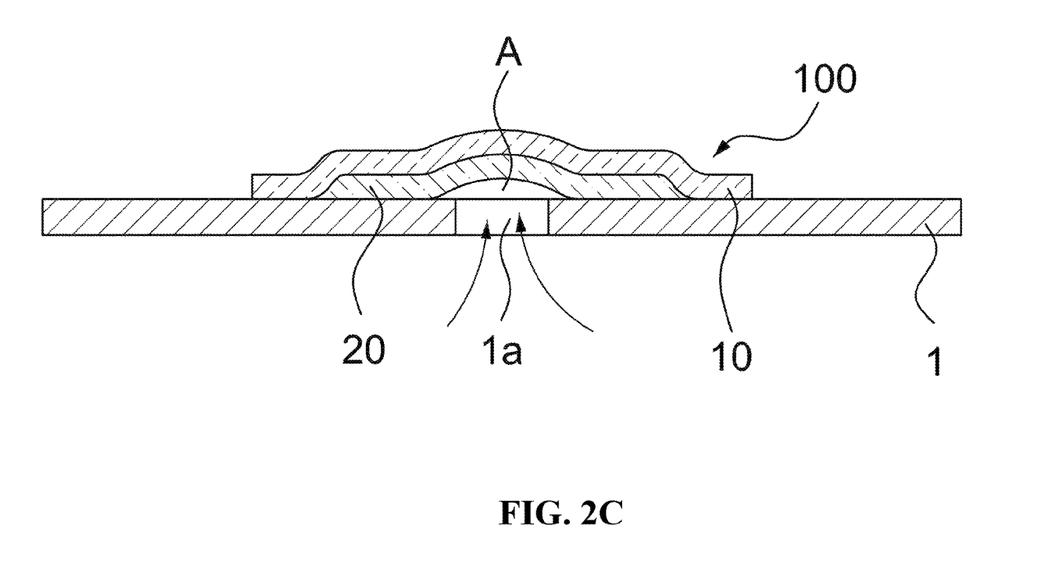
FIG. 2C is a cross-sectional view taken along line A-A on FIG. 1 illustrating a state where the gas discharge valve for a packaging material according to the first embodiment of the present disclosure is opened by gas.
Figure 2D:
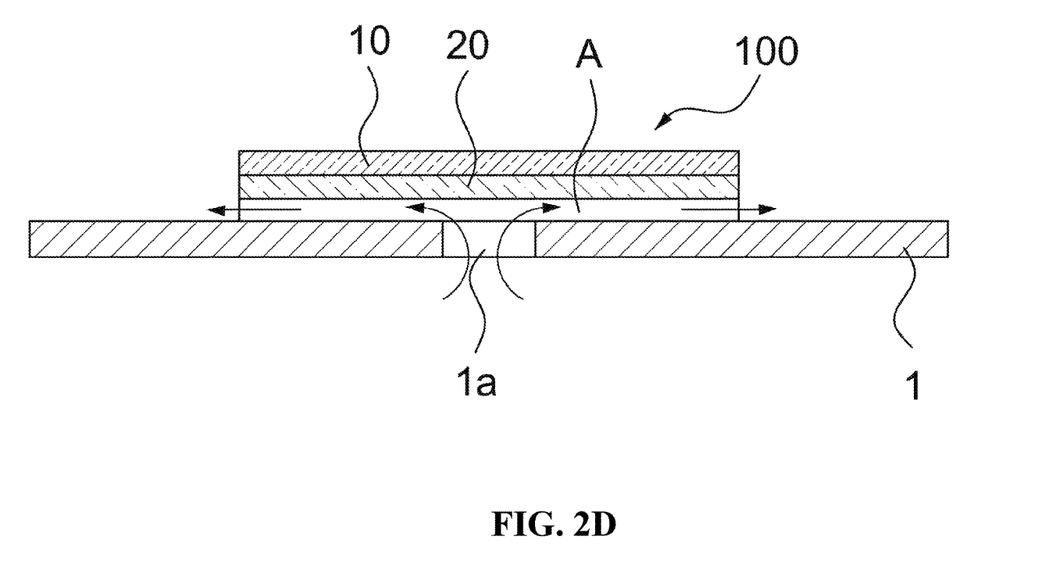
FIG. 2D is a cross-sectional view taken along line B-B on FIG. 1 illustrating the state where the gas discharge valve for a packaging material according to the first embodiment of the present disclosure is opened by the gas.

FIG. 1 is a perspective view illustrating a state where a gas discharge valve for a packaging material according to the first embodiment of the present disclosure is attached to a packing material. FIG. 2A is a cross-sectional view taken along line A-A on FIG. 1 illustrating the state where the gas discharge valve for a packaging material according to the first embodiment of the present disclosure is attached to the packing material. FIG. 2B is a cross-sectional view taken along line B-B on FIG. 1 illustrating the state where the gas discharge valve for a packaging material according to the first embodiment of the present disclosure is attached to the packing material. FIG. 2C is a cross-sectional view taken along line A-A on FIG. 1 illustrating a state where the gas discharge valve for a packaging material according to the first embodiment of the present disclosure is opened by gas. FIG. 2D is a cross-sectional view taken along line B-B on FIG. 1 illustrating the state where the gas discharge valve for a packaging material according to the first embodiment of the present disclosure is opened by the gas.

In the related art, a valve for controlling discharge of gas occurring in a packing material is a product that is manufactured using plastic-injection molding and has a complex structure. This valve is attached to a packing material to adjust the gas discharge. Alternatively, gas occurring within the packing material is removed through formation of an oil film formed of oil. However, in the related art, a manufactured defect due to the complex structure, an increase in production cost, and the like occur. Furthermore, while outside oxygen is blocked using the oil film, contamination of the oil occurs and the oil is discharged to the outside. The present disclosure is provided to prevent these problems and to provide a low-cost, easy-to-use valve that finds application in packing materials for various foods. The feature of a gas discharge valve 100 for a packaging material according to the present disclosure is that a gas discharge valve is formed by stacking films with different adhesiveness on top of one another. In the gas discharge valve 100, self-adhesiveness of each of the films is adjusted according to an amount of gas occurring in a food accommodated within the packing material. A size of a valve is adjusted to open and close the gas discharge valve 100. Furthermore, a modifying agent is added to the film to be adhered to the packing material and thus, the film has the form of a sticky gel. Accordingly, the film has a property of being easily opened and closed at a low pressure, as well as at a high pressure. With the gas discharge valve 100, a packaged state of the food accommodated within the packing material can be stably maintained without the food being contaminated, and a stable packaged state of the food can be maintained at a high-pressure or high-temperature environment.

As illustrated, the gas discharge valve 100 for a packaging material according to the present disclosure is attached to an upper surface of a packing material 1 in such a manner to cover a through-hole 1a formed in one side of the packing material 1 within which contents are accommodated, and allows only gas within the packing material 1 to pass through to the outside. The gas discharge valve 100 includes a high-adhesiveness layer 10 and a low-adhesiveness layer 20. The high-adhesiveness layer 10 is attached to an external surface of the packing material 1 and is adhered in a lengthwise direction to a portion of the external surface of the packing material 1 in the vicinity of the through-hole 1a. The low-adhesiveness layer 20 is formed inside the high-adhesiveness layer 10 and is adhered in such a manner to cover a top opening of the through-hole 1a. In this configuration, when gas occurs within the packing material 1, a portion of the low-adhesiveness layer 20 is raised by pressure, and thus the gas is discharged. When the pressure is released, the low-adhesiveness layer 20 returns to an original state thereof, and thus the through-hole 1a is sealed, thereby blocking outside air from being introduced.

In addition, the high-adhesiveness layer 10 and the low-adhesiveness layer 20 are adhered in the form of a film to a portion of the packing material 1 in the vicinity of the through-hole 1a and is protected by a release paper (not illustrated).

Figure 3A:
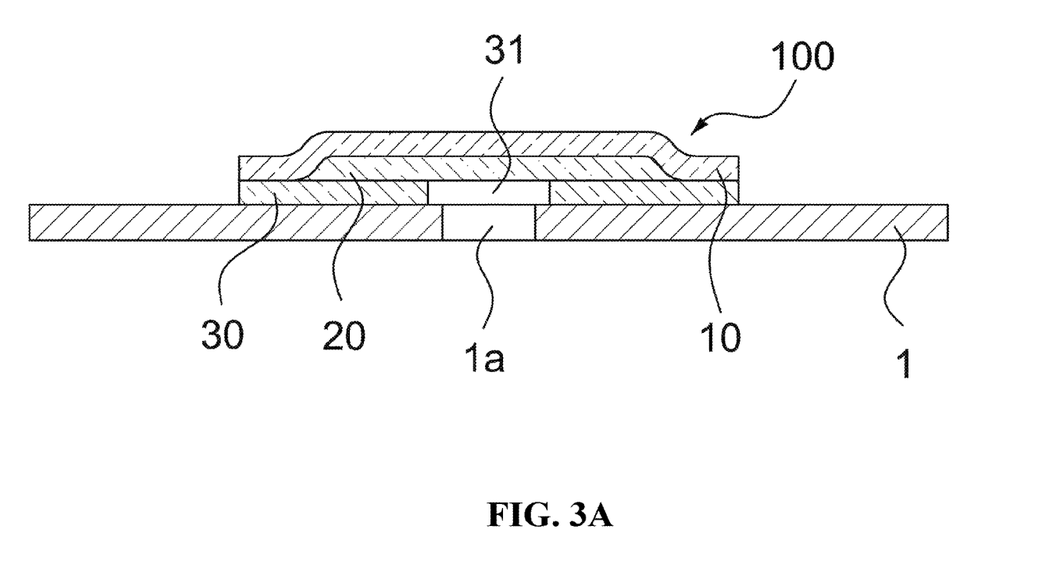
FIG. 3A is a cross-sectional view taken along line A-A on FIG. 1 illustrating a state where a gas discharge valve for a packaging material according to a second embodiment of the present disclosure is attached to the packing material.
Figure 3B:
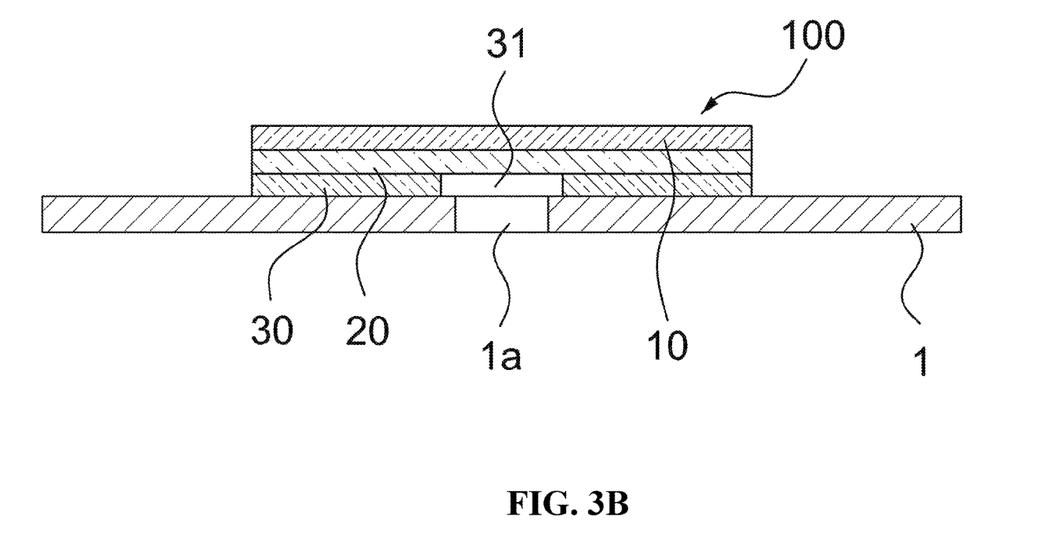
FIG. 3B is a cross-sectional view taken along line B-B on FIG. 1 illustrating the state where the gas discharge valve for a packaging material according to the second embodiment of the present disclosure is attached to the packing material.

In addition, an auxiliary high-adhesiveness layer 30 may be formed on both sides of the low-adhesiveness layer 20. The auxiliary high-adhesiveness layer 30 serves to firmly maintaining an attached state of an edge portion of the high-adhesiveness layer 10 when a portion of the low-adhesiveness layer 20 is raised by an internal pressure.

In addition, the high-adhesiveness layer 10 and the low-adhesiveness layer 20 are configured in such a manner that a ratio of a width of the low-adhesiveness layer 20 to a width of an edge portion, formed on one of both sides of the low-adhesiveness layer 20, of the high-adhesiveness layer 10 is 10:5. However, the low-adhesiveness layer 20 and the high-adhesiveness layer 10 may vary widely in width and length according to food contents accommodated within the packing material 1.

As an example, in a case where a width of the gas discharge valve 100 for a packaging material is 20 mm, the low-adhesiveness layer 20 is 10 mm, and the width of one edge portion, extending to the low-adhesiveness layer 20, of the high-adhesiveness layer 10 formed on an upper surface of the low-adhesiveness layer 20 is 5 mm Therefore, a total width of the high-adhesiveness layer 10 adhered to the packing material 1 is 20 mm. In this manner, various configurations of the gas discharge valve 100 may be employed. At this point, the low-adhesiveness layer 20 has an adhesive strength of 2 gf to 200 gf, and the high-adhesiveness layer 10 has an adhesive strength of 1,000 gf to 3,000 gf.

Moreover, the gas discharge valve 100 for a packaging material according to the present disclosure is configured by stacking the film-type high-adhesiveness layer 10 on top of the film-type low-adhesiveness layer 20. Thus, an adhesive force of the low-adhesiveness layer 20 of the gas discharge valve 100 may be chemically adjusted according to an amount of gas occurring in a food accommodated within the packing material 1, a high-pressure or low-pressure environment, or a high-temperature environment. Thus, an opening pressure, a closing pressure, a gas discharge speed, and the like may be adjusted. Therefore, the gas discharge valve 100 capable of applying the opening and closing pressures which vary suitably according to the packaged food can be provided.

A feature of the gas discharge valve 100 is as follows. The low-adhesiveness layer 20 is formed of silicone adhesive in such a manner as to be adhered to a surface of the packing material 1 and thus is configured to maintain a gel state. Thus, gas is easy to discharge according to pressure within the packing material 1. After an internal pressure is released, the gel-type low-adhesiveness layer 20 is adhered back to the surface of the packing material 1. Thus, the gel-type low-adhesiveness layer 20 has the feature of physically blocking outside oxygen from being introduced.

Another implementation example of the low-adhesiveness layer 20 may be provided. That is, the low-adhesiveness layer 20 may be formed of resin with self-adhesiveness that is selected from among low-density PE, metallocene, ethylene-vinyl acetate copolymer (EVA), PB, EMA, EAA, EMAA, and EMMA.

Still another implementation example of the low-adhesiveness layer 20 may be provided. That is, the low-adhesiveness layer 20 may be configured by mixing olepin resin, such as PE or PP, with a plasticizer and an anti-fog agent. A silicone thin film layer may be formed on a surface, brought into the packing material 1, of the low-adhesiveness layer 20. Thus, the adhesiveness thereof can be not only maintained, but also improved.

Another feature of the gas discharge valve 100 is as follows. Small-molecure polyisobutylene (PIB) is added into the low-adhesiveness layer 20, and thus a sticky state of the low-adhesiveness layer 20 is maintained. At the same time, the low-adhesiveness layer 20 continuously maintains the form of a sticky gel, with the migration effect in which polyisobutylene (KB) migrates to the outside with the passage of time.

Mode for Invention

The high-adhesiveness layer 10 is formed of resin with adhesiveness that is selected from among acrylic resin, rubber resin, silicone resin, and butyl resin.

The gas discharge valve 100 for a packaging material according to the present disclosure is configured as described above, and next, an operational state thereof is described in detail with reference to FIGS. 2A to 2D.

FIGS. 2A and 2C are views taken along A-A on FIG. 1 illustrating a state where the gas discharge valve 100 for a packaging material is adhered to a portion of an external circumferential surface of the packing material 1 in the vicinity of the through-hole 1a. FIGS. 2B and 2D are views taken along B-B on FIG. 1 illustrating the state where the gas discharge valve 100 for a packaging material is adhered to the portion of the external circumferential surface of the packing material 1 in the vicinity of the through-hole 1a.

As illustrated, the low-adhesiveness layer 20 of the gas discharge valve 100 is adhered, in the lengthwise direction on a portion of an upper surface of the packing material 1 in the vicinity of the through-hole 1a, in a manner that seals the through-hole 1a. The high-adhesiveness layer 10 is adhered to the packing material 1 in a manner that covers edge portions, in the lengthwise direction, of the low-adhesiveness layer 20. Thus, the high-adhesiveness layer 10 is installed in an adhered manner on the packing material 1 to protect the low-adhesiveness layer 20 covered therewith.

As described above, in a case where gas occurs within the packing material 1 due to a chemical change in a food itself, such as ground coffee or a fermented food, that is accommodated within the packing material 1 on which the gas discharge valve 100 is installed, the packing material 1, as illustrated in FIGS. 2C and 2D, is inflated due to a gas pressure. At this point, the gas is introduced into the through-hole 1a and then is discharged to the outside the through-hole 1a. At the same time, a portion, under which the through-hole 1a is formed, of the low-adhesiveness layer 20 is raised while the low-adhesiveness layer 20 is held in place by the high-adhesiveness layer 10 that fixes the edge portions of the low-adhesiveness layer 20 in a manner that surrounds the edge portions thereof in the lengthwise direction. Thus, an opening space A communicating with the outside is formed, and the gas is discharged to the outside through the opening space A.

Still another feature of the gas discharge valve 100 is as follows. In a case where the gas pressure within the packing material 1 is released through the opening space A described above, the inflated packing material 1 returns to an original state thereof. The low-adhesiveness layer 20 returns to an original state thereof at the same time when the internal pressure is released. Thus, the low-adhesiveness layer 20 is brought into contact with a portion of an external circumferential surface of the packing material 1 in the vicinity of the through-hole 1a, and the opening space A disappears. Accordingly, with this physical structure, outside oxygen is blocked from being introduced into the packing material 1 and thus ground coffee, a fermented food, or the like that is accommodated within the packing material 1 can be prevented from being contaminated and degenerating.

Still another feature of the gas discharge valve 100 is as follows. As illustrated in FIGS. 3A to 3D, the auxiliary high-adhesiveness layer 30 is formed underneath the high-adhesiveness layer 10 surrounding the low-adhesiveness layer 20. Thus, a state of the adhesion between the packing material 1 and the high-adhesiveness layer 10 is maintained more firmly. Thus, even in a case where the packing material 1 is made of roughened paper or the like or where the packing material 1 is folded and thus a surface thereof is difficult to keep flat, stable transformation of the low-adhesiveness layer 20 is possible with the auxiliary high-adhesiveness layer 30 attached to the surface of the packing material 1.

Therefore, still another feature of the gas discharge valve 100 is as follows. In the case where the packing material 1 is made of roughened paper or the like, the auxiliary high-adhesiveness layer 30 in the form of a gel having the self-adhesiveness is adhered to the surface of the roughened packing material 1. Then, in a state where the low-adhesiveness layer 20 formed on an upper surface of the auxiliary high-adhesiveness layer 30 closes the through-hole 1a, the high-adhesiveness layer 10 is formed on the upper surface of the low-adhesiveness layer 20. Thus, a firmly adhered state of the high-adhesiveness layer 10 is ensured.

That is, as illustrated, a hole 31 that is concentric with and communicates with the through-hole 1a in the packing material 1 is formed in a center portion of the auxiliary high-adhesiveness layer 30. The auxiliary high-adhesiveness layer 30 with this hole 31 is adhered to the packing material 1. The low-adhesiveness layer 20 and the high-adhesiveness layer 10 are stacked on the upper surface of the auxiliary high-adhesiveness layer 30.

Figure 3C:
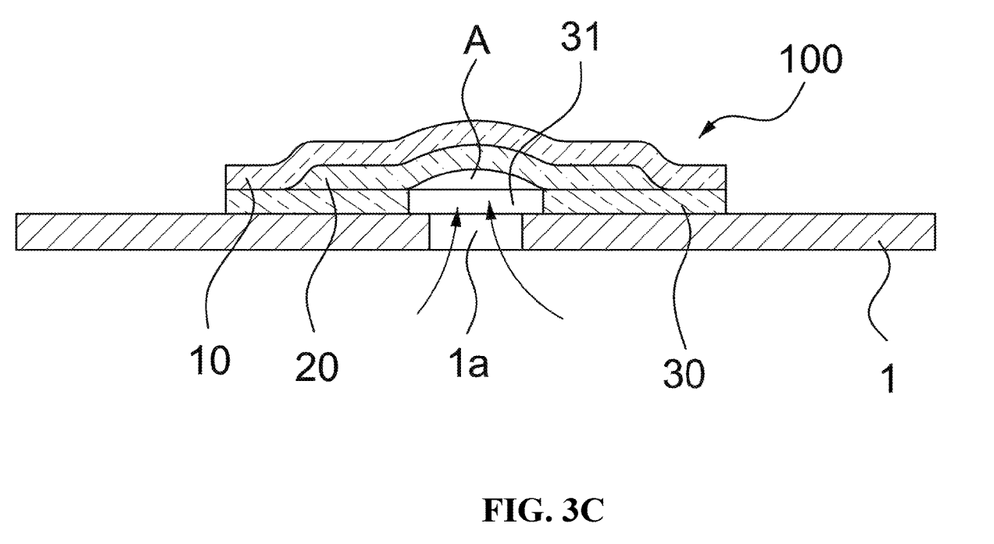
FIG. 3C is a cross-sectional view taken along line A-A on FIG. 1 illustrating a state where the gas discharge valve for a packaging material according to the second embodiment of the present disclosure is opened by the gas.
Figure 3D:
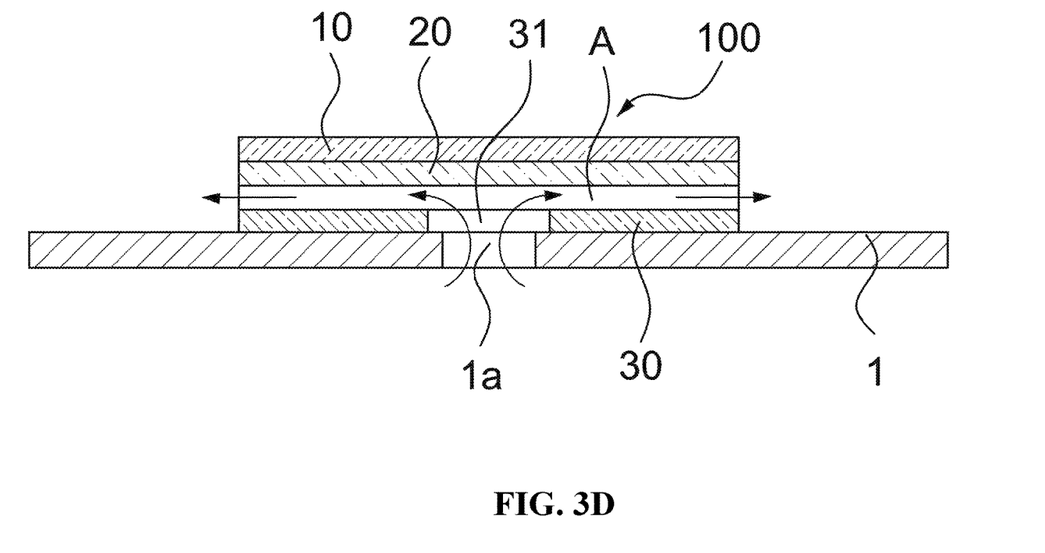
FIG. 3D is a cross-sectional view taken along line B-B on FIG. 1 illustrating the state where the gas discharge valve for a packaging material according to the second embodiment of the present disclosure is opened by the gas.

In this configuration, in a case where pressure occurs within the packing material 1, gas passes through the through-hole 1a and the hole 31 and then presses against the low-adhesiveness layer 20. Thus, with this pressing, a discharge space A is created between the low-adhesiveness layer 20 and the auxiliary high-adhesiveness layer 30. The gas is discharged into the discharge space A.

Still another feature of the gas discharge valve 100 is as follows. In a case where gas is discharged and pressure is released, the low-adhesiveness layer 20 in the same form as described above is adhered to the surface of the auxiliary high-adhesiveness layer 30, and thus the discharge space A disappears. Accordingly, a packaged state of ground coffee, a predetermined fermented food, or the like that is accommodated within the packing material 1 can be maintained stably and hygienically.

Figure 4:
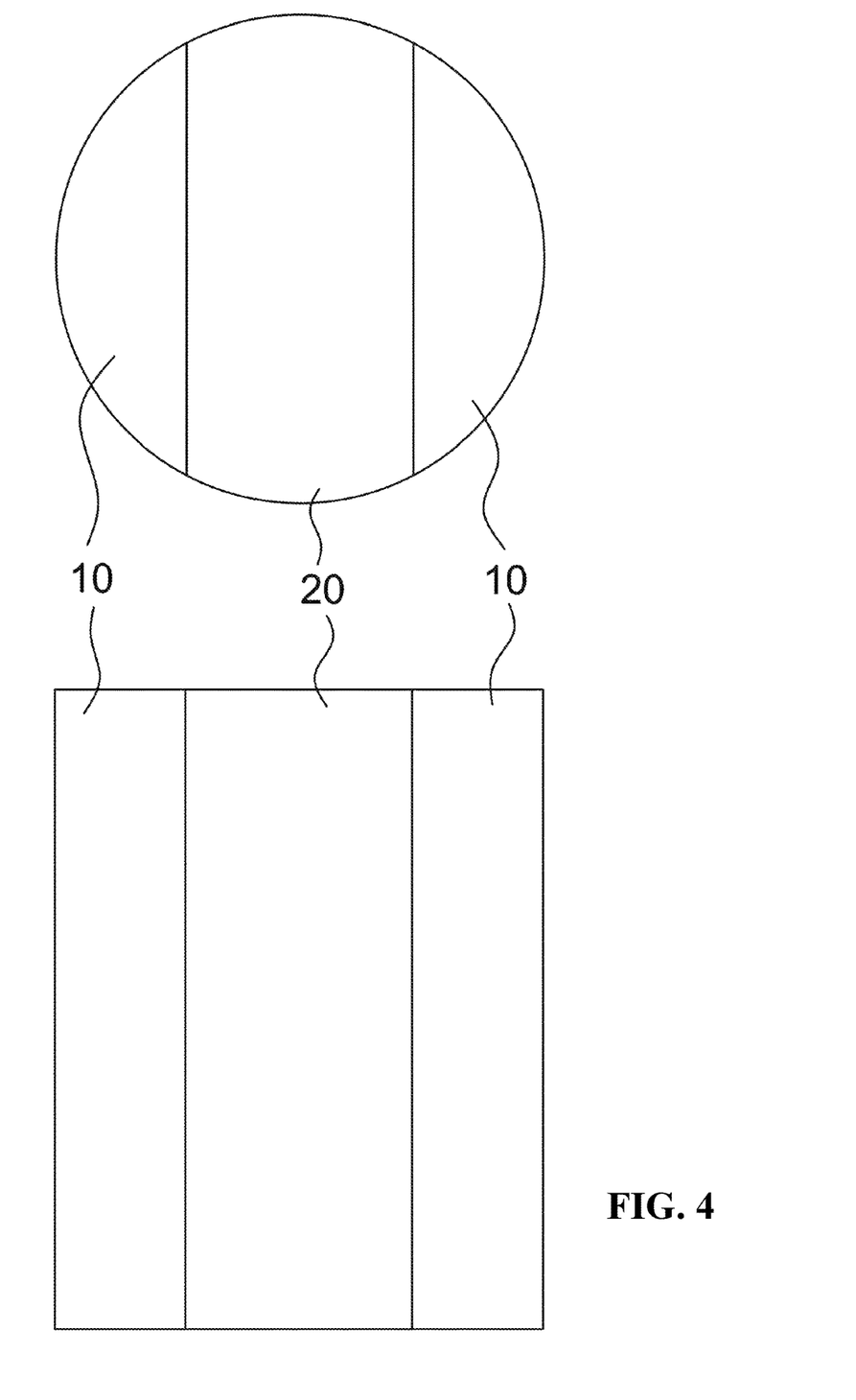
FIG. 4 is a plane view schematically illustrating the gas discharge valve for a packaging material according to the first embodiment or the second embodiment of the present disclosure.

As illustrated in FIG. 4, the gas discharge valve 100 for a packaging material may be formed in a circular or rectangular shape according to a form of the packing material 1 and the pressure of the gas occurring within the packing material 1.

However, the gas discharge valve 100 for a packaging material has the same structure as described above. That is, the low-adhesiveness layer 20 is adhered to an upper surface of the packing material 1 in such a manner as to cover the top opening of the through-hole 1a in the packing material 1. The high-adhesiveness layer 10 is adhered to the packing material 1 in such a manner that covers both edge portions of the low-adhesiveness layer 20, and thus the adhered state of the high-adhesiveness layer 10 is maintained.

The gas discharge valve 100 for a packaging material according to the present disclosure, configured as described above, may be used in an automated production line. That is, depending on a field situation of equipment where the gas discharge valve 100 is used, the high-adhesiveness layer 10 and the low-adhesiveness layer 20 are formed in the form of a film and then are rolled up into the gas discharge valve 100. Then, the gas discharge valve 100 in the form of a roll is punched and is formed into a finished shape in the automated production line. Thereafter, the gas discharge valve 100 may be used in a manner that is adhered to the surface of the packing material 1. Alternatively, a punching operation may be performed on the gas discharge valve 100 in the form of a roll, and then the gas discharge valve 100 may be used in the automated production line in a state of being formed in a finished shape on a per-sheet basis.

The preferred embodiments, as described above, are disclosed with reference to the drawings. Specific terms are used throughout the specification for the purpose of describing the present disclosure. However, the specific terms are not used to impose any limitation on meaning or to limit the scope of the present disclosure that is defined by the claims From the present specification, it would be understandable to a person of ordinary skill in the art that various modifications and other equivalent embodiment are possible. The legitimate technical scope of the present disclosure should be determined by the technical idea that is defined in the following claims.

INDUSTRIAL APPLICABILITY

As described above, the gas discharge valve for a packaging material according to the preferred embodiments of the present disclosure is installed on a packing material for a commodity transported in a packaged state, such as ground coffee or a predetermined fermented food. The gas discharge valve has the feature of smoothly discharging gas occurring from the commodity during transportation, blocking introduction of outside air into the packing material, and thus preventing a decrease in a commercial value of the commodity.

In addition, the gas discharge valve for a packaging material according to the present disclosure is configured to include a high-adhesiveness layer configured in the form of a film and a low-adhesiveness layer formed underneath a portion of the high-adhesiveness layer. In a case where the low-adhesiveness layer is adhered to an upper surface of a packing material in such a manner to cover a gas discharge through-hole formed in the packing material and to seal the packing material and where gas occurs within the sealed packing material and thus the sealed packing material expands, the low-adhesiveness layer is moved a distance from the packing material by pressure and thus the through-hole is opened to discharge the gas. After the gas is discharged, the low-adhesiveness layer closes the through-hole. This process of opening and closing the through-hole is naturally performed. Thus, it can be ensured that the gas occurring due to a chemical change, such as maturation or fermentation, of a food itself that is accommodated within the packing material is smoothly discharged and that oxygen is blocked from being introduced into the packing material. Accordingly, a packaged state of ground coffee, a predetermined fermented food, or the like that is accommodated within the packing material can be stably maintained. Furthermore, the gas discharge valve for a packaging material is capable of easily adjusting respective sizes, widths, thicknesses, and the like of the high-adhesiveness layer and the low-adhesiveness layer and thus of dealing with different amounts of discharged gas and discharge speeds for a food, such as ground coffee, that is accommodated within the packing material. Thus, the gas discharge valve has the feature of improving the packaging quality of ground coffee or a predetermined fermented food. Therefore, the gas discharge valve has industrial applicability.

The invention claimed is:

1. A gas discharge valve for a packaging material, the gas discharge valve attached to an upper surface of a packing material in a manner that covers a through-hole formed in one side of the packing material and configured to discharge to an outside thereof only gas within the packing material within which contents are accommodated, the gas discharge valve comprising:

a high-adhesiveness layer attached directly to an external surface of the packing material and adhered in a lengthwise direction to a portion of the external surface of the packing material in a vicinity of the through-hole; and a low-adhesiveness layer formed inside the high-adhesiveness layer and adhered in such a manner to cover a top opening of the through-hole, wherein, when gas occurs within the packing material in a state where the high-adhesiveness is adhered to the packing material, the low-adhesiveness layer is inflated by pressure, a portion thereof is raised, and the gas is discharged, and when the pressure is released, the low-adhesiveness layer returns to an original state thereof, the through-hole is sealed, and outside air is blocked from being introduced, wherein the low-adhesiveness layer is formed of resin with self-adhesiveness that is selected from one of low-density PE (polyethylene), metallocene, EVA (ethylene vinyl acetate), PB (polybutylene), EMA (ethylene methyl acrylate), EAA (ethylene acrylic acid), EMAA (ethylene methacrylic acid), and EMMA (ethylene methyl methacrylate), and wherein the low-adhesiveness layer formed of the resin with self-adhesiveness that is selected from one of low-density PE, metallocene, EVA, PB, EMA, EAA, EMAA, and EMMA further includes a silicone thin film on a surface thereof.

2. The gas discharge valve of claim 1, wherein the high-adhesiveness layer and the low-adhesiveness layer are adhered in the form of a film to a portion of the packing material in the vicinity of the through-hole.

3. The gas discharge valve of claim 1, further comprising:
an auxiliary high-adhesiveness layer formed between the low-adhesiveness layer and the packing material, with a hole concentric with and communicating with the through-hole being formed in the auxiliary high-adhesiveness layer, wherein even in a case where the packing material is made of roughened paper or where the packing material is folded and thus a surface thereof is difficult to keep flat, a state where the low-adhesive layer is adhered to the packing material is maintained and the portion of the low-adhesiveness layer is smoothly raised and leveled.

4. The gas discharge valve of claim 1, wherein the high-adhesiveness layer and the low-adhesiveness layer are configured in such a manner that a ratio of a width of the low-adhesiveness layer to a width of an edge portion, formed on one of both sides of the low-adhesiveness layer, of the high-adhesiveness layer is 10:5.

5. The gas discharge valve of claim 1, wherein the low-adhesiveness layer is further formed of silicone adhesive.

6. The gas discharge valve of claim 1, wherein the low-adhesiveness layer is configured by mixing olepin resin, which comprises PE or PP, with a plasticizer and an anti-fog agent.

7. The gas discharge valve of claim 1, the high-adhesiveness layer is formed of resin with adhesiveness that is selected from among acrylic resin, rubber resin, silicone resin, and butyl resin.

8. The gas discharge valve of claim 1, wherein small-molecule polyisobutylene (PIB) is added into the low-adhesiveness layer, and thus the low-adhesiveness layer maintains the form of a sticky gel due to PIB that migrates to the outside with the passage of time.

* * * * *